(12) United States Patent
Kwon et al.

(10) Patent No.: US 9,625,009 B2
(45) Date of Patent: Apr. 18, 2017

(54) PLANETARY GEAR TRAIN OF AUTOMATIC TRANSMISSION FOR VEHICLES

(71) Applicant: Hyundai Motor Company, Seoul (KR)

(72) Inventors: Hyun Sik Kwon, Seoul (KR); Jae Chang Kook, Hwaseong-si (KR); Seongwook Ji, Ansan-si (KR); Wonmin Cho, Hwaseong-si (KR); Wookjin Jang, Yongin-si (KR); Seong Wook Hwang, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/939,523

(22) Filed: Nov. 12, 2015

(65) Prior Publication Data

US 2017/0074359 A1    Mar. 16, 2017

(30) Foreign Application Priority Data

Sep. 14, 2015 (KR) .......................... 10-2015-0129870

(51) Int. Cl.
*F16H 3/66* (2006.01)

(52) U.S. Cl.
CPC ......... *F16H 3/66* (2013.01); *F16H 2200/006* (2013.01); *F16H 2200/201* (2013.01);
(Continued)

(58) Field of Classification Search
CPC ................ F16H 3/66; F16H 2200/006; F16H 2200/201; F16H 2200/2046; F16H 2200/2097
(Continued)

(56) References Cited

U.S. PATENT DOCUMENTS

| 8,096,914 B2 | 1/2012 | Aota et al. |
| 2003/0162624 A1* | 8/2003 | Kao .......................... F16H 3/66 475/280 |

(Continued)

FOREIGN PATENT DOCUMENTS

| EP | 1398532 A2 * | 3/2004 | ............... F16H 3/66 |
| KR | 10-2012-0121158 A | 11/2012 | |

*Primary Examiner* — Roger Pang
(74) *Attorney, Agent, or Firm* — Morgan, Lewis & Bockius LLP

(57) ABSTRACT

A planetary gear train of an automatic transmission may include: an input shaft; an output shaft; first to third planetary gear sets and six control elements disposed between rotating elements, and disposed at portions where rotating elements are selectively connected to transmission housing, first rotating shaft including first rotating element and ninth rotating element and selectively connected with input shaft; second rotating shaft including second rotating element and fourth rotating element; third rotating shaft including third rotating element and selectively connected with input shaft or transmission housing; fourth rotating shaft including fifth rotating element; fifth rotating shaft including sixth rotating element and directly connected with transmission housing; sixth rotating shaft including seventh rotating element and selectively connected with second rotating shaft or fourth rotating shaft; and seventh rotating shaft including eighth rotating element and selectively connected with second rotating shaft and simultaneously and is directly connected with output shaft.

10 Claims, 2 Drawing Sheets

(52) U.S. Cl.
CPC ............... *F16H 2200/2046* (2013.01); *F16H 2200/2097* (2013.01)

(58) Field of Classification Search
USPC .......................................... 475/275–291, 318
See application file for complete search history.

(56) References Cited

U.S. PATENT DOCUMENTS

| | | | |
|---|---|---|---|
| 2006/0019795 A1* | 1/2006 | Usoro | F16H 3/66 475/282 |
| 2006/0252594 A1* | 11/2006 | Bucknor | F16H 3/66 475/275 |
| 2016/0319914 A1* | 11/2016 | Lee | F16H 3/66 |
| 2016/0333982 A1* | 11/2016 | Hwang | F16H 3/66 |

* cited by examiner

FIG. 2

|    | C1 | C2 | C3 | C4 | C5 | B1 | Gear ratio |
|----|----|----|----|----|----|----|------------|
| D1 | ●  |    |    | ●  |    | ●  | 4.235      |
| D2 | ●  |    |    |    | ●  | ●  | 2.139      |
| D3 | ●  |    |    | ●  | ●  |    | 1.714      |
| D4 | ●  |    | ●  |    | ●  |    | 1.476      |
| D5 | ●  | ●  |    |    | ●  |    | 1.385      |
| D6 |    | ●  | ●  |    | ●  |    | 1.216      |
| D7 |    | ●  | ●  | ●  |    |    | 1.000      |
| D8 |    | ●  |    | ●  | ●  |    | 0.776      |
| REV| ●  |    | ●  |    |    | ●  | -1.200     |

PLANETARY GEAR TRAIN OF AUTOMATIC TRANSMISSION FOR VEHICLES

CROSS-REFERENCE TO RELATED APPLICATION

The present application claims priority to and the benefit of Korean Patent Application No. 10-2015-0129870 filed on Sep. 14, 2015, the entire contents of which is incorporated herein for all purposes by this reference.

BACKGROUND OF THE INVENTION

Field of the Invention

The present invention relates to an automatic transmission for a vehicle. More particularly, the present invention relates to a planetary gear train of an automatic transmission of a vehicle that improves power delivery performance and reduces fuel consumption by achieving eight forward speed stages using a minimum number of constituent elements.

Description of Related Art

The recent increase in oil prices causes carmakers to meet global demands of improving fuel efficiency.

Accordingly, researches are being conducted on engines in terms of reducing weight and improving fuel efficiency by down-sizing, and researches are also being conducted to ensure both drivability and competitiveness by maximizing fuel efficiency by implementing an automatic transmission with multiple stages.

However, in the case of the automatic transmission, the number of internal components is increased as the number of gear shift stages is increased, which may cause deterioration in terms of mountability, costs, weight and power transmission efficiency.

Therefore, in order to increase an effect of improving fuel efficiency by implementing an automatic transmission with multiple stages, it is important to develop a planetary gear train capable of maximizing efficiency using a small number of components.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission of a vehicle having advantages of improving power delivery performance and fuel economy by achieving eight forward speed stages and one reverse speed stage using a minimum number of constituent elements, and of improving silent driving using a driving point positioned at a low engine speed.

An exemplary embodiment of the present invention provides a planetary gear train of an automatic transmission for a vehicle, the planetary gear train including: an input shaft which receives power from an engine; an output shaft which outputs power changed in speed; a first planetary gear set which has first, second, and third rotating elements; a second planetary gear set which has fourth, fifth, and sixth rotating elements; a third planetary gear set which has seventh, eighth, and ninth rotating elements; and six control elements which are disposed between the rotating elements, and disposed at portions where the rotating elements are selectively connected to a transmission housing, a first rotating shaft which includes the first rotating element and the ninth rotating element and is selectively connected with the input shaft; a second rotating shaft which includes the second rotating element and the fourth rotating element; a third rotating shaft which includes the third rotating element and is selectively connected with the input shaft or transmission housing; a fourth rotating shaft which includes the fifth rotating element; a fifth rotating shaft which includes the sixth rotating element and is directly connected with the transmission housing; a sixth rotating shaft which includes the seventh rotating element and is selectively connected with the second rotating shaft or the fourth rotating shaft; and a seventh rotating shaft which includes the eighth rotating element and is selectively connected with the second rotating shaft and simultaneously and is directly connected with the output shaft.

The first planetary gear set may be a single pinion planetary gear set in which the first rotating element is a first sun gear, the second rotating element is a first planet carrier, and the third rotating element is a first ring gear, the second planetary gear set may be a single pinion planetary gear set in which the fourth rotating element is a second sun gear, the fifth rotating element is a second planet carrier, and the sixth rotating element is a second ring gear, and the third planetary gear set may be a single pinion planetary gear set in which the seventh rotating element is a third sun gear, the eighth rotating element is a third planet carrier, and the ninth rotating element is a third ring gear.

The six control elements may include: a first clutch which selectively connects the input shaft and the first rotating shaft; a second clutch which selectively connects the input shaft and the third rotating shaft; a third clutch which selectively connects the second rotating shaft and the seventh rotating shaft; a fourth clutch which selectively connects the second rotating shaft and the sixth rotating shaft; a fifth clutch which selectively connects the fourth rotating shaft and the sixth rotating shaft; and a first brake which selectively connects the third rotating shaft and the transmission housing.

Gear shift stages, which are implemented by selectively operating the six control elements, may include: a first forward gear shift stage which is implemented by simultaneously operating the first and fourth clutches and the first brake; a second forward gear shift stage which is implemented by simultaneously operating the first and fifth clutches and the first brake; a third forward gear shift stage which is implemented by simultaneously operating the first, fourth, and fifth clutches; a fourth forward gear shift stage which is implemented by simultaneously operating the first, third, and fifth clutches; a fifth forward gear shift stage which is implemented by simultaneously operating the first, second, and fifth clutches; a sixth forward gear shift stage which is implemented by simultaneously operating the second, third, and fifth clutches; a seventh forward gear shift stage which is implemented by simultaneously operating the second, third, and fourth clutches; an eighth forward gear shift stage which is implemented by simultaneously operating the second, fourth, and fifth clutches; and a reverse gear shift stage which is implemented by simultaneously operating the first and third clutches and the first brake.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart of control elements at each speed stage in the planetary gear train according to an exemplary embodiment of the present invention.

Figure 1:
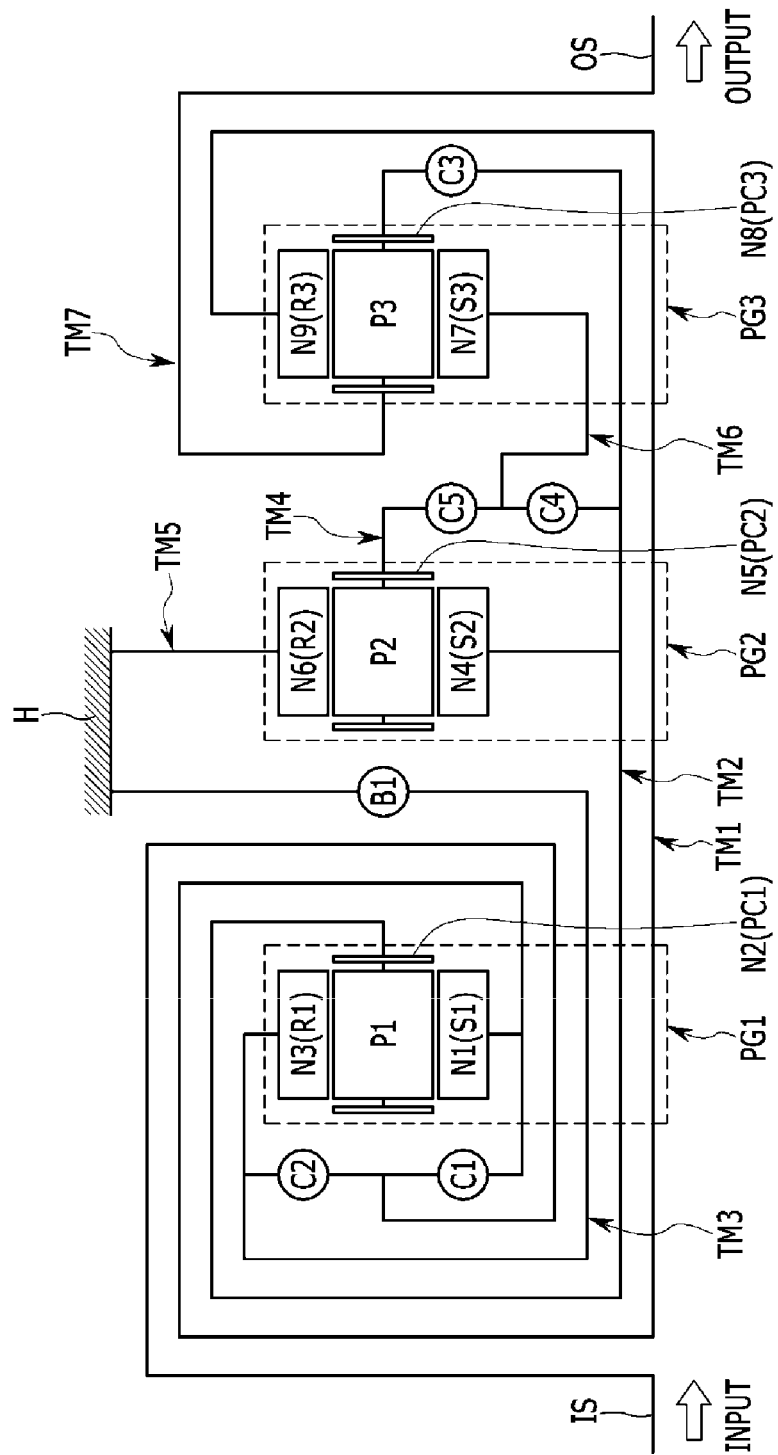
FIG. 1 is a configuration diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In describing the present invention, parts that are not related to the description will be omitted. Like reference numerals generally designate like elements throughout the specification.

Further, in the following detailed description, names of constituents, which are in the same relationship, are divided into "the first", "the second", and the like, but the present invention is not limited to the order in the following description.

FIG. 1 is a configuration diagram of a planetary gear train according to an exemplary embodiment of the present invention.

Referring to FIG. 1, the planetary gear train according to the exemplary embodiment of the present invention includes first, second, and third planetary gear sets PG1, PG2, and PG3 which are coaxially disposed, an input shaft IS, an output shaft OS, seven rotating shafts TM1 to TM7 which are configured by respective rotating elements of the first, second, and third planetary gear sets PG1, PG2, and PG3, six control elements C1 to C5 and B1, and a transmission housing H.

Further, rotational power inputted from the input shaft IS is changed in speed by complementary operations of the first, second, and third planetary gear sets PG1, PG2, and PG3, and then outputted through the output shaft OS.

The respective simple planetary gear sets are disposed in the order of the first, second, and third planetary gear sets PG1, PG2, and PG3 from an engine.

The input shaft IS is an input member, and rotational power from a crankshaft of the engine is converted into torque by a torque converter, and the torque is inputted.

The output shaft OS is an output member, and disposed coaxially with the input shaft IS to transmit the driving power, which is changed in speed, to a driving shaft through a differential apparatus.

The first planetary gear set PG1 is a single pinion planetary gear set, and includes rotating elements including a first sun gear S1 which is a first rotating element N1, a first planet carrier PC1 which is a second rotating element N2 for supporting a first pinion P1 that externally engages with the first sun gear S1 that is the first rotating element N1, and a first ring gear R1 which is a third rotating element N3 that internally engages with the first pinion P1.

The second planetary gear set PG2 is a single pinion planetary gear set, and includes a second sun gear S2 which is a fourth rotating element N4, a second planet carrier PC2 which is a fifth rotating element N5 for supporting a second pinion P2 that externally engages with the second sun gear S2 that is the fourth rotating element N4, and a second ring gear R2 which is a sixth rotating element N6 that internally engages with the second pinion P2.

The third planetary gear set PG3 is a single pinion planetary gear set, and includes a third sun gear S3 which is a seventh rotating element N7, a third planet carrier PC3 which is an eighth rotating element N8 for supporting a third pinion P3 that externally engages with the third sun gear S3 that is the seventh rotating element N7, and a third ring gear R3 which is a ninth rotating element N9 that internally engages with the third pinion P3.

The first, second, and third planetary gear sets PG1, PG2, and PG3 are operated while retaining the total of seven rotating shafts TM1 to TM7 in a state in which the first rotating element N1 is directly connected with the ninth rotating element N9, and the second rotating element N2 is directly connected with the fourth rotating element N4.

The configurations of the seven rotating shafts TM1 to TM7 will be described below.

The first rotating shaft TM1 includes the first rotating element N1 (the first sun gear S1) and the ninth rotating element N9 (the third ring gear R3), and is selectively connected with the input shaft IS.

The second rotating shaft TM2 includes the second rotating element N2 (the first planet carrier PC1) and the fourth rotating element N4 (the second sun gear S2).

The third rotating shaft TM3 includes the third rotating element N3 (the first ring gear R1), and is selectively connected with the input shaft IS and simultaneously and is selectively connected with the transmission housing H.

The fourth rotating shaft TM4 includes the fifth rotating element N5 (the second planet carrier PC2).

The fifth rotating shaft TM5 includes the sixth rotating element N6 (the second ring gear R2), and is directly connected with the transmission housing H The sixth rotating shaft TM6 includes the seventh rotating element N7 (the third sun gear S3), and is selectively connected with the second rotating shaft TM2 and the fourth rotating shaft TM4.

The seventh rotating shaft TM7 includes the eighth rotating element N8 (the third planet carrier PC3), and is directly connected with the output shaft OS and simultaneously and is selectively connected with the second rotating shaft TM2.

Further, the five clutches C1, C2, C3, C4, and C5 which are control elements, are disposed at portions where the rotating shafts of the rotating shafts TM1 to TM7 are selectively connected to each other.

In addition, the one brake B1, which is control element, is disposed at portions where the rotating shafts of the rotating shafts TM1 to TM7 are selectively connected with the transmission housing H.

Positions at which the six control elements C1 to C5 and B1 are disposed will be described below.

The first clutch C1 is disposed between the input shaft IS and the first rotating shaft TM1, and allows the input shaft IS and the first rotating shaft TM1 to be selectively integrated with each other.

The second clutch C2 is disposed between the input shaft IS and the third rotating shaft TM3, and allows the input shaft IS and the third rotating shaft TM3 to be selectively integrated with each other.

The third clutch C3 is disposed between the second rotating shaft TM2 and the seventh rotating shaft TM7, and allows the second rotating shaft TM2 and the seventh rotating shaft TM7 to be selectively integrated with each other.

The fourth clutch C4 is disposed between the second rotating shaft TM2 and the sixth rotating shaft TM6, and allows the second rotating shaft TM2 and the sixth rotating shaft TM6 to be selectively integrated with each other.

The fifth clutch C5 is disposed between the fourth rotating shaft TM4 and the sixth rotating shaft TM6, and allows the fourth rotating shaft TM4 and the sixth rotating shaft TM6 to be selectively integrated with each other.

The first brake B1 is interposed between the third rotating shaft TM3 and the transmission housing H, and allows the third rotating shaft TM3 to be selectively operated as a fixation element.

The control elements, which include the first, second, third, fourth, and fifth clutches C1, C2, C3, C4, and C5 and the first brake B1 as described above, may be a multi-plate hydraulic frictional coupling unit that is frictionally coupled by hydraulic pressure.

FIG. 2 is an operation chart of control elements at each speed stage in the planetary gear train according to an exemplary embodiment of the present invention.

As shown in FIG. 2, three control elements are operated at each speed stage in the planetary gear train according to the exemplary embodiment of the present invention.

At a gear shift stage for a first forward speed D1, the first and fourth clutches C1 and C4 and the first brake B1 are operated simultaneously. Therefore, as power is inputted to the first rotating shaft TM1 in a state in which the input shaft IS is connected with the first rotating shaft TM1 by the operation of the first clutch C1 and the second rotating shaft TM2 is connected with the sixth rotating shaft TM6 by the operation of the fourth clutch C4, and the third rotating shaft TM3 is operated as a fixation element by the operation of the first brake B1 in a state in which the fifth rotating shaft TM5 is continuously operated as a fixation element, the first forward speed is carried out and power is outputted to output shaft OS through the seventh rotating shaft TM7.

At a gear shift stage for a second forward speed D2, the first and fifth clutches C1 and C5 and the first brake B1 are operated simultaneously. Therefore, as power is inputted to the first rotating shaft TM1 in a state in which the input shaft IS is connected with the first rotating shaft TM1 by the operation of the first clutch C1 and the fourth rotating TM4 is connected with the sixth rotating shaft TM6 by the operation of the fifth clutch C5, and the third rotating shaft TM3 is operated as a fixation element by the operation of the first brake B1 in a state in which the fifth rotating shaft TM5 is continuously operated as a fixation element, the second forward speed is carried out and power is outputted to output shaft OS through the seventh rotating shaft TM7.

At a gear shift stage for a third forward speed D3, the first, fourth, and fifth clutches C1, C4, and C5 are operated simultaneously. Therefore, as power is inputted to the first rotating shaft TM1 in a state in which the input shaft IS is connected with the first rotating shaft TM1 by the operation of the first clutch C1, the second rotating shaft TM2 is connected with the sixth rotating shaft TM6 by the operation of the fourth clutch C4, and the fourth rotating shaft TM4 is connected with the sixth rotating shaft TM6 by the operation of the fifth clutch C5, and the fifth rotating shaft TM5 is continuously operated as a fixation element, the third forward speed is carried out and power is outputted to output shaft OS through the seventh rotating shaft TM7.

At a gear shift stage for a fourth forward speed D4, the first, third, and fifth clutches C1, C3, and C5 are operated simultaneously. Therefore, as power is inputted to the first rotating shaft TM1 in a state in which the input shaft IS is connected with the first rotating shaft TM1 by the operation of the first clutch C1, the second rotating shaft TM2 is connected with the seventh rotating shaft TM7 by the operation of the third clutch C3, and the fourth rotating shaft TM4 is connected with the sixth rotating shaft TM6 by the operation of the fifth clutch C5, and the fifth rotating shaft TM5 is continuously operated as a fixation element, the fourth forward speed is carried out and power is outputted to output shaft OS through the seventh rotating shaft TM7.

At a gear shift stage for a fifth forward speed D5, the first, second, and fifth clutches C1, C2, and C5 are operated simultaneously. Therefore, as power is inputted to the first rotating shaft TM1 and the third rotating shaft TM3 in a state in which the input shaft IS is connected with the first rotating shaft TM1 by the operation of the first clutch C1, the input shaft IS is connected with the third rotating shaft TM3 by the operation of the second clutch C2, and the fourth rotating shaft TM4 is connected with the sixth rotating shaft TM6 by the operation of the fifth clutch C5, and the fifth rotating shaft TM5 is continuously operated as a fixation element, the fifth forward speed is carried out and power is outputted to output shaft OS through the seventh rotating shaft TM7.

At a gear shift stage for a sixth forward speed D6, the first, third, and fifth clutches C1, C3, and C5 are operated simultaneously. Therefore, as power is inputted to the third rotating shaft TM3 in a state in which the input shaft IS is connected with the third rotating shaft TM3 by the operation of the second clutch C2, the second rotating shaft TM2 is connected with the seventh rotating shaft TM7 by the operation of the third clutch C3, and the fourth rotating shaft TM4 is connected with the sixth rotating shaft TM6 by the operation of the fifth clutch C5, and the fifth rotating shaft TM5 is continuously operated as a fixation element, the sixth forward speed is carried out and power is outputted to output shaft OS through the seventh rotating shaft TM7.

At a gear shift stage for a seventh forward speed D7, the second, third, and fourth clutches C2, C3, and C4 are operated simultaneously. Therefore, as power is inputted to the third rotating shaft TM3 in a state in which the input shaft IS is connected with the third rotating shaft TM3 by the operation of the second clutch C2, the second rotating shaft TM2 is connected with the seventh rotating shaft TM7 by the operation of the third clutch C3, and the second rotating shaft TM2 is connected with the sixth rotating shaft TM6 by the operation of the fourth clutch C4, and the fifth rotating shaft TM5 is continuously operated as a fixation element, the seventh forward speed is carried out and power is outputted to output shaft OS through the seventh rotating shaft TM7.

At a gear shift stage for a eighth forward speed D8, the second, fourth, and fifth clutches C2, C4, and C5 are operated simultaneously. Therefore, as power is inputted to the third rotating shaft TM3 in a state in which the input shaft IS is connected with the third rotating shaft TM3 by the operation of the second clutch C2, the second rotating shaft TM2 is connected with the sixth rotating shaft TM6 by the operation of the fourth clutch C4, and the fourth rotating shaft TM4 is connected with the sixth rotating shaft TM6 by the operation of the fifth clutch C5, and the fifth rotating shaft TM5 is continuously operated as a fixation element, the eighth forward speed is carried out and power is outputted to output shaft OS through the seventh rotating shaft TM7.

At a reverse speed stage REV, the first and third clutches C1 and C3 and the third brake B3 are operated simultaneously. Therefore, as power is inputted to the first rotating shaft TM1 in a state in which the input shaft IS si connected with the first rotating shaft TM1 by the operation of the first clutch C1 and the second rotating shaft TM2 is connected with the seventh rotating shaft TM7 by the operation of the third clutch C3, and the third rotating shaft TM3 is operated as a fixation element by the operation of the first brake B1 in a state in which the sixth rotating shaft TM6 is continuously operated as a fixation element, a reverse speed is carried out and power is outputted to output shaft OS through the seventh rotating shaft TM7.

The planetary gear train according to the exemplary embodiment of the present invention may implement the gear shift stages for eight forward speeds and one reverse speed by operating and controlling the three planetary gear sets PG1, PG2, and PG3 using the five clutches C1, C2, C3, C4, and C5 and the one brake B1.

Since a speed stage suitable to engine speed can be achieved due to multiple speed stages, silent driving may be improved.

Since a speed stage suitable to engine speed can be achieved due to multiple speed stages, efficiency of the engine may be maximized and power delivery performance and fuel consumption may be better.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, the planetary gear train comprising:
    an input shaft which receives power from an engine;
    an output shaft which outputs power changed in speed;
    a first planetary gear set having first, second, and third rotating elements;
    a second planetary gear set having fourth, fifth, and sixth rotating elements;
    a third planetary gear set having seventh, eighth, and ninth rotating elements; and
    six control elements which are disposed between the rotating elements, and disposed at portions where the rotating elements are selectively connected with each other or to a transmission housing,
    a first rotating shaft including the first rotating element and the ninth rotating element and selectively connected with the input shaft;
    a second rotating shaft including the second rotating element and the fourth rotating element;
    a third rotating shaft including the third rotating element and selectively connected with the input shaft or transmission housing;
    a fourth rotating shaft including the fifth rotating element;
    a fifth rotating shaft including the sixth rotating element and directly connected with the transmission housing;
    a sixth rotating shaft including the seventh rotating element and selectively connected with the second rotating shaft or the fourth rotating shaft; and
    a seventh rotating shaft including the eighth rotating element and selectively connected with the second rotating shaft and simultaneously and is directly connected with the output shaft.

2. The planetary gear train of claim 1, wherein
the first planetary gear set is a single pinion planetary gear set in which the first rotating element is a first sun gear, the second rotating element is a first planet carrier, and the third rotating element is a first ring gear,
the second planetary gear set is a single pinion planetary gear set in which the fourth rotating element is a second sun gear, the fifth rotating element is a second planet carrier, and the sixth rotating element is a second ring gear, and
the third planetary gear set is a single pinion planetary gear set in which the seventh rotating element is a third sun gear, the eighth rotating element is a third planet carrier, and the ninth rotating element is a third ring gear.

3. The planetary gear train of claim 1, wherein the six control elements include:
    a first clutch which selectively connects the input shaft and the first rotating shaft;
    a second clutch which selectively connects the input shaft and the third rotating shaft;
    a third clutch which selectively connects the second rotating shaft and the seventh rotating shaft;
    a fourth clutch which selectively connects the second rotating shaft and the sixth rotating shaft;
    a fifth clutch which selectively connects the fourth rotating shaft and the sixth rotating shaft; and
    a first brake which selectively connects the third rotating shaft and the transmission housing.

4. The planetary gear train of claim 3, wherein gear shift stages, which are implemented by selectively operating the six control elements, include:
    a first forward gear shift stage which is implemented by simultaneously operating the first and fourth clutches and the first brake;
    a second forward gear shift stage which is implemented by simultaneously operating the first and fifth clutches and the first brake;

a third forward gear shift stage which is implemented by simultaneously operating the first, fourth, and fifth clutches;
a fourth forward gear shift stage which is implemented by simultaneously operating the first, third, and fifth clutches;
a fifth forward gear shift stage which is implemented by simultaneously operating the first, second, and fifth clutches;
a sixth forward gear shift stage which is implemented by simultaneously operating the second, third, and fifth clutches;
a seventh forward gear shift stage which is implemented by simultaneously operating the second, third, and fourth clutches;
an eighth forward gear shift stage which is implemented by simultaneously operating the second, fourth, and fifth clutches; and
a reverse gear shift stage which is implemented by simultaneously operating the first and third clutches and the first brake.

5. A planetary gear train of an automatic transmission for a vehicle, the planetary gear train comprising:
an input shaft which receives power from an engine;
an output shaft which outputs power changed in speed;
a first planetary gear set which is a single pinion planetary gear set and has first, second, and third rotating elements;
a second planetary gear set which is a single pinion planetary gear set and has fourth, fifth, and sixth rotating elements;
a third planetary gear set which is a single pinion planetary gear set and has seventh, eighth, and ninth rotating elements;
a first rotating shaft including the first rotating element and the ninth rotating element and selectively connected with the input shaft;
a second rotating shaft including the second rotating element and the fourth rotating element;
a third rotating shaft including the third rotating element and selectively connected with the input shaft or transmission housing;
a fourth rotating shaft including the fifth rotating element;
a fifth rotating shaft including the sixth rotating element and directly connected with the transmission housing;
a sixth rotating shaft including the seventh rotating element and selectively connected with the second rotating shaft or the fourth rotating shaft;
a seventh rotating shaft including the eighth rotating element and selectively connected with the second rotating shaft and simultaneously and directly connected with the output shaft;
a first clutch which selectively connects the input shaft and the first rotating shaft;
a second clutch which selectively connects the input shaft and the third rotating shaft;
a third clutch which selectively connects the second rotating shaft and the seventh rotating shaft;
a fourth clutch which selectively connects the second rotating shaft and the sixth rotating shaft;
a fifth clutch which selectively connects the fourth rotating shaft and the sixth rotating shaft; and
a first brake which selectively connects the third rotating shaft and the transmission housing.

6. The planetary gear train of claim 5, wherein
the first planetary gear set is configured that the first rotating element is a first sun gear, the second rotating element is a first planet carrier, and the third rotating element is a first ring gear,
the second planetary gear set is configured that the fourth rotating element is a second sun gear, the fifth rotating element is a second planet carrier, and the sixth rotating element is a second ring gear, and
the third planetary gear set is configured that the seventh rotating element is a third sun gear, the eighth rotating element is a third planet carrier, and the ninth rotating element is a third ring gear.

7. The planetary gear train of claim 5, wherein gear shift stages, which are implemented by selectively operating the five clutches and the one brake, include:
a first forward gear shift stage which is implemented by simultaneously operating the first and fourth clutches and the first brake;
a second forward gear shift stage which is implemented by simultaneously operating the first and fifth clutches and the first brake;
a third forward gear shift stage which is implemented by simultaneously operating the first, fourth, and fifth clutches;
a fourth forward gear shift stage which is implemented by simultaneously operating the first, third, and fifth clutches;
a fifth forward gear shift stage which is implemented by simultaneously operating the first, second, and fifth clutches;
a sixth forward gear shift stage which is implemented by simultaneously operating the second, third, and fifth clutches;
a seventh forward gear shift stage which is implemented by simultaneously operating the second, third, and fourth clutches;
an eighth forward gear shift stage which is implemented by simultaneously operating the second, fourth, and fifth clutches; and
a reverse gear shift stage which is implemented by simultaneously operating the first and third clutches and the first brake.

8. A planetary gear train of an automatic transmission for a vehicle, the planetary gear train comprising:
an input shaft which receives power from an engine;
an output shaft which outputs power changed in speed;
a first planetary gear set which is a single pinion planetary gear set, and has a first sun gear, a first planet carrier, and a first ring gear;
a second planetary gear set which is a single pinion planetary gear set, and has a second sun gear, a second planet carrier, and a second ring gear;
a third planetary gear set which is a single pinion planetary gear set, and has a third sun gear, a third planet carrier, and a third ring gear;
a first rotating shaft including the first sun gear and the third ring gear and selectively connected with the input shaft;
a second rotating shaft including the first planet carrier and the second sun gear;
a third rotating shaft including the first ring gear and selectively connected with the input shaft or the transmission housing;
a fourth rotating shaft including the second planet carrier;
a fifth rotating shaft including the second ring gear and directly connected with the transmission housing;
a sixth rotating shaft including the third sun gear and selectively connected with the second rotating shaft or the fourth rotating shaft;

a seventh rotating shaft including the third planet carrier and selectively connected with the second rotating shaft and simultaneously and directly connected with the output shaft; and six control elements which are disposed between the rotating shafts, disposed at portions where the rotating shafts are selectively connected to a transmission housing.

9. The planetary gear train of claim 8, wherein the six control elements include:
   a first clutch which selectively connects the input shaft and the first rotating shaft;
   a second clutch which selectively connects the input shaft and the third rotating shaft;
   a third clutch which selectively connects the second rotating shaft and the seventh rotating shaft;
   a fourth clutch which selectively connects the second rotating shaft and the sixth rotating shaft;
   a fifth clutch which selectively connects the fourth rotating shaft and the sixth rotating shaft; and
   a first brake which selectively connects the third rotating shaft and the transmission housing.

10. The planetary gear train of claim 9, wherein gear shift stages, which are implemented by selectively operating the six control elements, include:
    a first forward gear shift stage which is implemented by simultaneously operating the first and fourth clutches and the first brake;
    a second forward gear shift stage which is implemented by simultaneously operating the first and fifth clutches and the first brake;
    a third forward gear shift stage which is implemented by simultaneously operating the first, fourth, and fifth clutches;
    a fourth forward gear shift stage which is implemented by simultaneously operating the first, third, and fifth clutches;
    a fifth forward gear shift stage which is implemented by simultaneously operating the first, second, and fifth clutches;
    a sixth forward gear shift stage which is implemented by simultaneously operating the second, third, and fifth clutches;
    a seventh forward gear shift stage which is implemented by simultaneously operating the second, third, and fourth clutches;
    an eighth forward gear shift stage which is implemented by simultaneously operating the second, fourth, and fifth clutches; and
    a reverse gear shift stage which is implemented by simultaneously operating the first and third clutches and the first brake.

* * * * *